May 11, 1965   N. E. ROGEN   3,182,507
THERMAL HISTORY GAGE
Filed Nov. 30, 1960
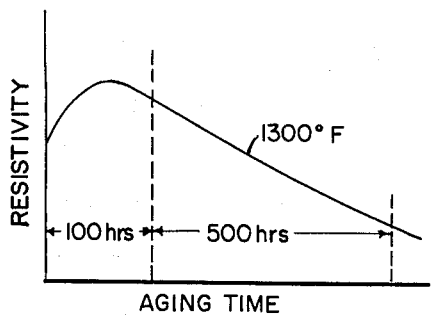
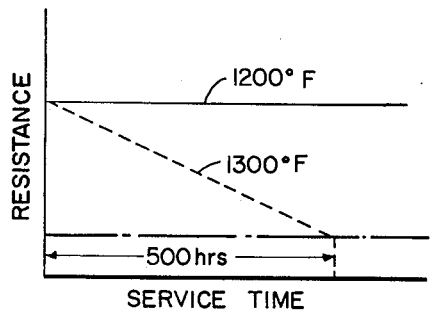
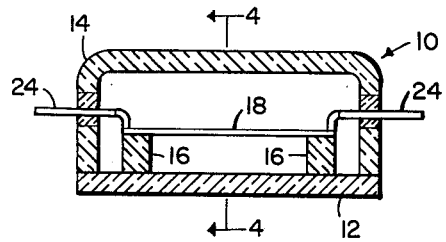
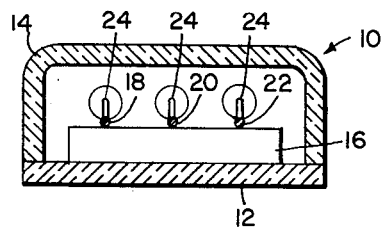
INVENTOR.
NEIL E. ROGEN
BY
ATTORNEYS

United States Patent Office 3,182,507
Patented May 11, 1965

3,182,507
THERMAL HISTORY GAGE
Neil E. Rogen, Cambridge, Mass., assignor to Ilikon, Corporation, Natick, Mass., a corporation of Delaware
Filed Nov. 30, 1960, Ser. No. 72,661
14 Claims. (Cl. 73—362)

This invention relates to temperature measuring devices, and more particularly, to a novel and improved thermal history gage for determining the time interval of operation of a device at or above a predetermined temperature.

It is often desirable or necessary to determine how long a device has been operated at or above a predetermined temperature. For example, in an aircraft jet engine, prolonged overheating of the turbine blades may cause a transformation of the turbine blade material with an attendant loss in the high temperature-strength characteristic of the material. Accordingly, military and commercial service requirement for jet engine service inspection provides that the engine must be disassembled periodically, and portions thereof X-rayed. Also, it is a common practice to require sectioning of one of the turbine blades for metallurgical examination. Such a procedure is, of course, costly and results in the aircraft being removed from the operational category. While it might be possible to utilize known temperature measuring devices and recording instruments to determine the time interval of operation of the engine about a critical temperature, such instrumentation would be costly, and would undesirably decrease the pay load of the aircraft.

Accordingly, it is a primary object of this invention to provide a novel and improved means for determining the thermal history of an environment which does not require the use of complex and costly temperature measuring and recording instrumentation.

It is a further object of this invention to provide a novel and improved means for determining the thermal history of an environment which is suitable for use in locations which would normally be inaccessible with regard to conventional temperature measuring and recording equipment.

Other objects will be in part obvious, and in part pointed out more in detail hereinafter.

The objects of the present invention are achieved in a novel and improved thermal history gage characterized by an electrically conductive sensing element which is fabricated from a material which below a predetermined threshold temperature is stable and which at or above the threshold temperature undergoes a transformation as a function of temperature and time. This transformation results in a change in physical properties of the material including a change in resistivity of the material. By proper selection of the alloy and the heat treatment thereof, the resistance of the sensing element will provide an indication whether or not the gage has been exposed to a temperature equal to or exceeding the threshold temperature. In use, the gage is merely located within the environment, the thermal history of which it is desired to determine. After a selected interval of time, the resistance of the sensing element is measured either with the gage in place or after removal of the gage from the environment. From the resistance of the sensing element, it may then be determined whether the temperature of the environment in which the gage was installed exceeded a preselected temperature, and if so, for how long. A more complete understanding of the invention may be had with reference to the following detailed description when taken in connection with the following detailed drawing:

FIG. 1 is a graph illustrating the relationship of electrical resistivity of an age hardenable nickel-chrome alloy to the time of aging of the material at a particular temperature;

FIG. 2 is a graph illustrating the relationship of the electrical resistance of a sensing element of a thermal history gage of this invention with respect to time and temperature;

FIG. 3 is a cross sectional view of a thermal history gage constructed in accordance with the present invention; and FIG. 4 is a cross sectional view substantially along the line 4—4 of FIG. 3.

As heretofore indicated, a thermal history gage of the present invention is characterized by a temperature sensing element fabricated from material which has the characteristic that, after suitable heat treatment, exposure of the sensing element to a temperature equal to or exceeding a certain threshold temperature will result in a predictable change in resistance of the sensing element as a function of time and temperature. A group of materials which have this desired characteristic are the so called age or precipitation hardenable alloys. The terms "age or precipitation hardenable alloys" is used herein to define alloys which consist essentially of a base material and one or more alloying elements which will, after suitable heat treatment, provide a secondary phase in precipitate particle form with the precipitate consisting essentially of a compound of the base metal and one or more of the alloying elements. Such alloys have found particular use in providing structures which have high strength at elevated temperatures. The increased strength and hardness of these alloys results from the precipitation of compounds of the base metal, and at least one of the alloying elements when the alloy is aged at elevated temperatures. Accordingly, such alloys are generally referred to as being age hardenable, or precipitation hardenable alloys. A well known group of age hardenable alloys are those comprising metals such as nickel and chromium with additional minor percentages of hardening constituents such as titanium and aluminum as well as other elements such as carbon, columbian, molybdenum, tungsten, etc. it being understood that all of the additional elements do not necessarily occur in every alloy. It will, of course, be understood that there are many other alloys other than those set forth above which fall within the category of age or precipitation hardening alloys.

The controlled heat treatment of an age or precipitation hardenable alloy is normally accomplished after the alloy has been manufactured into the final product. The heat treating of articles fabricated of age hardenable alloys normally comprises the solution treatment of the part followed by a second heat treatment to accomplish the aging desired. An intermediate heat treatment may or may not be performed depending on the end use of the article. The solution treatment of the article involves the heating of the alloy to a relatively high temperature under the melting point of the alloy, for example, 2000° F. until all of the constituents of the alloy are in solid solution. The alloy is held at the solution temperature for a relatively short time, for example, approximately two hours. The alloy is then cooled, usually in air, although an oil or water quench may be utilized in some instances. The alloy is subsequently aged by heat treatment, say at 1500° F., for a period of up to 24 hours. Such aging causes a precipitation of the base metal and an alloying element in a complex compound and imparts a high strength to the alloy at elevated temperatures. This precipitation of the base metal-alloying element compound is dependent upon temperature and time. In subsequent use of the alloy as long as the temperature of the alloy is maintained below the temperature at which it was aged, the structure of the alloy will remain substantially the same. However, if the alloy is raised to or above the aging temperature and held there, a transformation in the form of additional precipitation will occur, and the physical properties of the alloy will change.

One of the characteristics of an age hardenable alloy is that its electrical resistivity varies generally in the same manner as the hardness of the alloy. Thus, for a particular alloy, the resistivity will vary with time during the aging heat treatment of the alloy. The graph of FIG. 1 illustrates this relationship of electrical resistivity to aging time in a nickel-chrome-aluminum age hardenable alloy. It can be seen that at the aging temperature the resistivity of the alloy will increase for a certain initial period of time until it reaches a maximum, and then will decrease over a period of time which is substantially larger than the initial period during which the resistivity was increasing. As can be seen from FIG. 1, the aging time required for the resistivity of the alloy to reach its peak value and begin to decline may be somewhat in excess of 100 hours. Resistivity of the alloy will then further decline in an asymptotic manner for a period which may exceed 500 hours. It will be observed that after the resistivity begins to decline, the curve will be substantially linear for a prolonged period.

If the alloy is quenched at any point on the curve of FIG. 1, the properties of the alloy will be retained substantially the same as that which existed immediately prior to quenching. Subsequently, as long as the temperature of the alloy is below the aging temperature, the alloy will be relatively stable, in that substantially no further precipitation will occur. However, if the temperature of the alloy is raised to or above the threshold temperature, additional precipitation will occur and the resistivity of the alloy will again begin to vary along the curve of FIG. 1 as a function of temperature and time and will continue to do so as long as the temperature remains equal to or above the threshold temperature. It will be apparent from the curve of FIG. 1 that if the alloy is quenched after the resistivity peak has been reached, the alloy may be made to have a resistivity variation which is substantially linear over a prolonged period when and if the alloy is again heated to or above the threshold temperature.

In a preferred embodiment of this invention, a sensing element is fabricated from a thin wire of nickel-chrome age hardenable alloy. The sensing element is then solution treated and finally aged in the manner last described to provide a relationship of resistance and service time as shown in FIG. 2. With reference to FIG. 2, the initial resistance of the gage is set by the point on the curve of FIG. 1 at which quenching occurred. This initial resistance will remain substantially constant at temperatures below the threshold temperature as shown by the 1200° F. line of FIG. 2. However, the sensing element resistance will vary in a substantially linear manner when the gage is heated to or above the threshold temperature, which as shown in FIG. 2 is 1300° F. It will be noted that the variation of sensing element resistance will be cumulative in the case of an environment which cyclically varies above and below the threshold temperature. Thus, the resistance of the sensing element will provide an indication of the thermal history of the environment in which the sensing element was installed.

With reference to FIGS. 3 and 4, a specific embodiment of a thermal history gage of the present invention comprises a sealed housing 10 including a base 12 and an enclosing body 14. The housing is fabricated of a suitable glass or other high temperature insulation material which is electrically non-conductive. Mounted in the housing and on the base 12 are a pair of support members 16 also fabricated of material such as that of the housing. In the gage of FIGS. 3 and 4, a plurality of electrically conductive sensing elements 18, 20, and 22 are suitably mounted on the support 16. A plurality of pairs of terminals 24 extend through opposite sides of the housing and are connected respectively to the ends of the sensing elements. The terminals extend outwardly through seals in the housing to permit measurement of the resistance of the sensing elements from externally of the housing. The materials from which the housing and supports are fabricated should preferably be such that they will not react with the material of the sensing elements at elevated temperatures so as to preclude any undesired variation of the alloy of the sensing elements. Further, the housing is preferably filled with argon or any other suitable inert atmosphere.

Returning to the sensing elements, these components are preferably of elongated thin configuration, and in the specific embodiment, are wires of approximately fifteen mils. The sensitivity of the gage will be determined, to a large extent, by the size of the wires, and the smaller the wire, the greater the sensitivity. The alloys utilized in the sensing element of FIGS. 3 and 4 have an initial resistivity of approximately 750 ohms per mil foot and an initial resistance of approximately 10 ohms. The alloys of the sensing elements 18, 20, and 22 are of different composition in order to provide different threshold temperatures for the sensing elements, thus providing a gage which will indicate the thermal history of an environment with respect to a plurality of temperatures. For example, the sensing element 18 may be fabricated from an age hardenable alloy consisting essentially of 2% aluminum with a balance of nickel and chromium in an 80–20 relationship. The percentages given are atomic percentages. There may, of course, be minor amounts of additional elements present in the alloy. Such an alloy, after solution treatment, may be aged at 1300° F. in order to obtain the desired variation in resistivity both during and after the aging treatment.

The normal aging treatment might be, as indicated above, for a period up to 24 hours. However, it is preferred that in aging a sensing element of this invention, the aging treatment proceed for a time sufficient for the resistivity of the material to reach its peak and decline into the substantially linear portion of the curve of FIG. 1. This may require aging up to 100 hours. Accordingly, the material may be said to be overaged. It should be understood that the term "overaging," as used herein, actually refers to an aging period substantially larger than that normally used and is not used to refer to an intermediate treatment between solution treating and aging. The sensing element is preferably fabricated prior to the aging treatment, and it is, of course, understood that the sensing element is solution treated prior to aging. The time between solution treatment and aging is not critical and may be several days or longer.

In order to provide sensing elements for various threshold temperatures, the solute content is varied. More specifically, the lower the solute content the lower the temperature at which precipitation will begin. The sensing element 20 of FIGS. 3 and 4 is fabricated from an alloy consisting essentially of 2% aluminum, 2% titanium and the balance is 80–20 nickel and chromium. This alloy may be aged at 1400° F., thus providing a sensing element having a threshold temperature of 1400° F. The sensing element 22 has a threshold temperature of 1500° F. and is fabricated from an alloy consisting essentially of 3% aluminum, 3% titanium and the balance 80–20 nickel and chromium. The sensing elements 20 and 22, with the exception of the aging temperature, are heat treated in the same manner as the sensing element 18; that is to say, they are solution treated and then overaged for a period up to 100 hours or until the resistance of the sensing element has reached the desired value on the right hand side of a curve such as that of FIG. 1.

In service, the gage is installed in a location, the thermal history of which it is desired to determine. After a suitable service period, the resistances of the various sensing elements are measured. Let us assume that the resistances of the elements 18 and 20 have changed while the resistance of sensing element 22 has remained the same. This will thus indicate that the temperature of the environment did not reach 1500° F. The resistance change of the gage 20 will provide an indication of the time of operation at or above 1400° F., or in other words, between 1400° F. and 1500° F. The resistance of the gage 18 will, on the other hand, provide an indication of the time of operation above 1300° F. including the time of operation between 1400° F. and 1500° F. By means of prior calibration of sensing elements of the particular type concerned, we may determine the effect on the element 18 of the time of operation above 1400° F. as indicated by the element 20. This may be applied to the time-temperature indication provided by the element 18 so as to provide an indication of the time of operation between 1300° F. and 1400° F.

Thus, it can be seen that there has been provided a novel and improved thermal history gage for determining the thermal history of an environment which does not require the use of complex recording instruments. The gage is suitable for location in normally inaccessible locations inasmuch as it can be fabricated in very small sizes. For example, the gage of FIGS. 3 and 4 may be made to have an overall size approximating that of a dime. While threshold temperatures have been indicated as specific temperatures, it will be understood that there will be some variations due to minor variations in alloy composition as well as other tolerances. Accordingly, for example, where a gage is stated as being a 1300° F. gage, the threshold temperature may actually vary from say 1290° F. to 1310° F. However, it will be apparent that this variation will not detract from the utility of the gage inasmuch as the exact temperature is not usually particularly important. Also, as indicated above, alloys other than nickel-chromium age hardenable alloys may be utilized in the fabrication of sensing elements. For example, included within the scope of this invention is the use of a Martensitic transformation to indicate that a temperature of an environment has exceeded a certain value. While the Martensitic transformation is normally quite rapid, for example, on the order of one microsecond, the sensing element material would still fall within the requirement of undergoing a transformation as a function of time and temperature even though the time was exceedingly short. Thus, it should be emphasized that various substitutions and modifications in the alloys of a sensing element of this invention, as well as various modifications and changes in the structure heretofore described, may be made without departing from the scope of this invention.

Inasmuch as many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

It is also to be understood that the language in the following claims is intended to cover all of the generic and specific features of the invention herein described and all statements of the scope of the invention which, as a matter of language, might be said to fall therebetween.

I claim:

1. A thermal history gage for providing an indication of the length of time an environment has been at or above each of a plurality of temperatures, comprising a frame, and a plurality of electrically conductive sensing elements carried by the frame, each of said sensing elements being fabricated from a material which below a threshold temperature is stable and which at or above a threshold temperature undergoes a transformation as a function of temperature and time resulting in a change in physical properties of the material including a change in resistivity thereof, each of said sensing elements having a different threshold temperature.

2. A thermal history gage for providing an indication of the length of time an environment has been at or above each of a plurality of temperatures, comprising a housing, and a plurality of electrically conductive wire-like sensing elements mounted within the housing, each of said sensing elements being fabricated from a material which below a threshold temperature is stable and which at or above a threshold temperature undergoes a transformation as a function of temperature and time resulting in a change in physical properties of the material including a change in resistivity thereof, each of said sensing elements having a different threshold temperature, and a plurality of pairs of terminal means carried by said housing and respectively associated with said sensing elements whereby the resistance of each of said sensing elements may be measured from externally of said housing.

3. A thermal history gage comprising a housing, and a plurality of electrically conductive sensing elements sealed within the housing and each fabricated from an overaged age hardenable alloy, each of said sensing elements having been aged at different temperatures whereby the resistance of said sensing elements will provide an indication of the extent of time the gage has been exposed to each of a plurality of threshold temperatures respectively corresponding to the aging temperatures of the sensing elements.

4. A thermal history gage comprising a housing, and a plurality of electrically conductive wire-like sensing elements sealed within the housing and each fabricated from an overaged age hardenable alloy, the aging temperatures of said sensing elements being different whereby the resistance of said sensing elements will provide an indication of the extent of time the gage has been exposed to each of a plurality of threshold temperatures respectively corresponding to the aging temperatures of the sensing elements, an inert atmosphere filling said housing, and a plurality of pairs of terminals extending outwardly through the housing and respectively connected to said sensing elements, whereby the resistance of each of said sensing elements may be measured from externally of said housing.

5. The method of manufacturing, for use in a thermal history gage, a sensing element which will provide an indication of the exposure of the gage to a temperature equal to or exceeding a threshold temperature, comprising the steps of: fabricating a sensing element from an age hardenable alloy; heat treating the sensing element at a temperature below its melting point for a time sufficient to provide a solid solution; cooling said sensing element; subsequently overaging said sensing element at said threshold temperature for a predetermined time sufficient for the resistance of the sensing element to reach a peak and decline; and quenching the sensing element at the expiration of said predetermined time of aging.

6. A thermal history gage characterized by an electrically conductive sensing element which below a predetermined threshold temperature is stable and which at or above a predetermined threshold temperature undergoes a transformation as a function of temperature and time resulting in a change in physical properties of the material of the sensing element including a change in resistivity thereof, the sensing element prepared by fabricating a sensing element from an alloy having the characteristic of undergoing a transformation resulting in a change in physical properties, including resistivity thereof, when the alloy is heated to said preselected threshold temperature; heat-treating said sensing element at said threshold temperature for a predetermined time sufficient to establish a preselected resistance of the sensing element; and quenching said sensing element upon expiration of said predetermined time of heat treating, whereby the resistance of said sensing element indicates whether or not the gage has been exposed to a temperature equal to or exceeding said threshold temperature.

7. A thermal history gage comprising a housing, a sensing element mounted internally of the housing and being fabricated from a material which below a threshold temperature is stable and which at or above a threshold temperature undergoes a transformation as a function of temperature and time resulting in a change in physical properties of the material including a change in resistivity thereof, the sensing element prepared by fabricating a sensing element from an age hardenable alloy, heat treating the sensing element at a temperature below its melting point for a time sufficient to provide a solid solution; cooling said sensing element; subsequently aging said sensing element at said threshold temperature for a predetermined time sufficient to establish, by precipitation, a preselected resistance of the sensing element; and quenching the sensing element upon expiration of said predetermined time of aging.

8. A thermal history gage comprising a sealed housing containing an inert atmosphere, an electrically conductive sensing element fabricated from a material which below a threshold temperature is stable and which at or above a threshold temperature undergoes a transformation as a function of temperature and time resulting in a change in physical properties of the material including a change in resistivity, the sensing element prepared by fabricating a sensing element from an age hardenable alloy; heat treating the sensing element at a temperature below its melting point for a time sufficient to provide a solid solution; cooling said sensing element; subsequently overaging said sensing element at said threshold temperature for a predetermined time sufficient for the resistance of the sensing element to reach a peak and decline; and quenching the sensing element at the expiration of said predetermined time of aging.

9. The method of fabricating, for use in a thermal history gage, a sensing element which will provide an indication of the exposure of the gage to a temperature equal to or exceeding a preselected threshold temperature, comprising the steps of: fabricating a sensing element from an alloy having the characteristic of undergoing a transformation resulting in a change in physical properties, including resistivity thereof, when the alloy is heated to said preselected threshold temperature; heat treating said sensing element at said threshold temperature for a predetermined time sufficient to establish a preselected resistance of the sensing element; and quenching said sensing element upon expiration of said predetermined time of heat treating.

10. The method of manufacturing, for use in a thermal history gage, a sensing element which will provide an indication of the exposure of the gage to a temperature equal to or exceeding a threshold temperature: comprising the steps of fabricating a sensing element from an age hardenable alloy, heat treating the sensing element at a temperature below its melting point for a time sufficient to provide a solid solution; cooling said sensing element; subsequently aging said sensing element at said threshold temperature for a predetermined time sufficient to establish, by precipitation, a preselected resistance of the sensing element; and quenching the sensing element upon expiration of said predetermined time of aging.

11. A method of determining the thermal history of an environment which method comprises:
locating within an environment, the thermal history of which it is desired to determine, which environment cyclically varies above and below a predetermined threshold temperature, a sensing element fabricated from a material which below a predetermined threshold temperature is stable and which at or above said threshold temperature undergoes an irreversible predictable cummulative transformation in a measurable physical property thereof as a function of the time the element is exposed to a temperature equal to or greater than the threshold temperature which sensing element is prepared by fabricating a sensing element from an alloy having the characteristic of undergoing a transformation resulting in a change in physical properties, including resistivity thereof, when the alloy is heated to said preselected threshold temperature; heat treating said sensing element at said threshold temperature for a predetermined time sufficient to establish a preselected resistance of the sensing element; and quenching said sensing element upon expiration of said predetermined time of heat treating; and
measuring, after a selected interval of time, a change in resistivity of the sensing element thereby determining the thermal history of the environment.

12. The method of claim 11 which includes a plurality of sensing elements, each element having a predetermined different threshold temperature and wherein each element is measured separately to determine the time which each element has been exposed to a temperature equal to or above the threshold temperature of that particular element thereby determining the thermal history of the environment.

13. The method of claim 11 wherein the alloy is a nickel alloy and the threshold temperature is above 1300° F.

14. The method of claim 11 wherein the alloy is age-hardened for over 100 hours.

References Cited by the Examiner
UNITED STATES PATENTS

| | | | |
|---|---|---|---|
| 1,643,582 | 9/27 | Martin | 338—28 |
| 2,271,975 | 2/42 | Hall | 338—30 |
| 2,543,177 | 2/51 | Korsgren | 73—362 |
| 2,714,054 | 7/55 | Voltz | 338—30 |
| 2,782,137 | 2/57 | Jackson | 148—158 |
| 2,932,971 | 4/60 | Moore et al. | 73—193 X |

OTHER REFERENCES

Process and Physical Metallurgy, by James E. Garside, published by Charles Griffen and Co. Ltd., 1949, (pages 211–214 relied on).

ISAAC LISANN, *Primary Examiner.*